United States Patent [19]

Russell

[11] Patent Number: 4,713,181
[45] Date of Patent: Dec. 15, 1987

[54] METHOD AND APPARATUS FOR HANDLING SLUDGE

[75] Inventor: Frederick E. Russell, Elgin, Ill.

[73] Assignee: Protectaire Systems Co., Elgin, Ill.

[21] Appl. No.: 841,078

[22] Filed: Mar. 18, 1986

[51] Int. Cl.$^4$ .......................... B01D 33/00; C02F 1/40
[52] U.S. Cl. ..................................... 210/776; 210/783; 210/298; 210/387; 210/525
[58] Field of Search ............... 210/216, 251, 297, 298, 210/776, 319, 783, 384, 780, 387, 525, 541, 542

[56] References Cited

U.S. PATENT DOCUMENTS

| | | | |
|---|---|---|---|
| 2,851,163 | 9/1958 | Anderson | 210/387 |
| 3,896,030 | 7/1975 | Bähr | 210/384 |
| 4,019,431 | 4/1977 | Bastgen | 210/384 |
| 4,243,527 | 1/1981 | Leonard | 210/384 |
| 4,350,591 | 9/1982 | Lee | 210/384 |

Primary Examiner—Frank Sever
Attorney, Agent, or Firm—Fitch, Even, Tabin & Flannery

[57] ABSTRACT

A method and apparatus in which a water sludge suspension is initially separated from the water by skimming and then is conveyed to a dewatering station at which the sludge is oscillated or vibrated to separate mechanically the water from the solid sludge material. Preferably, at the dewatering station, the sludge is dropped a predetermined distance onto a sieve, the impact of the falling sludge producing a squeezing action on the sludge to initially exude the occluded water. The sieve, which is inclined, is then oscillated or vibrated to work the sludge to further exude water therefrom and to urge the sludge down the inclined surface of the sieve. After traveling to the bottom of the sieve, the sludge, now substantially dewatered, is received by a container for disposal.

4 Claims, 7 Drawing Figures

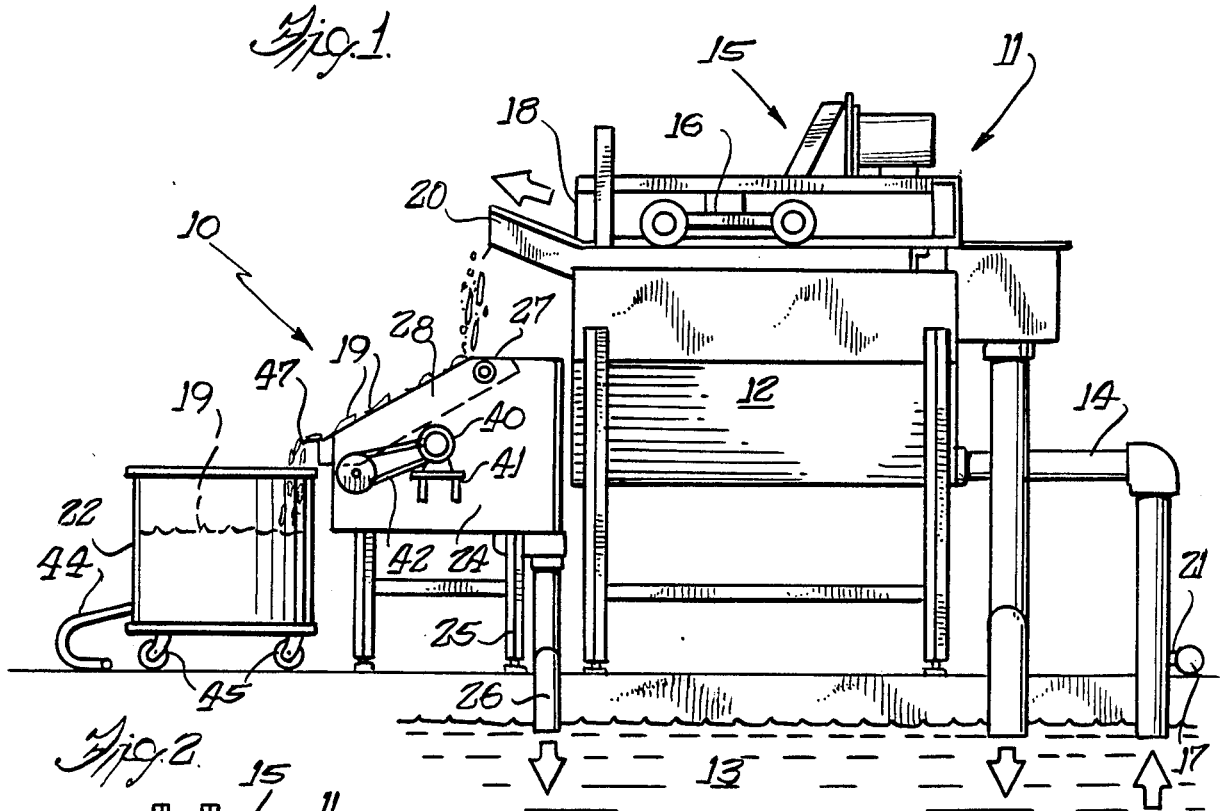
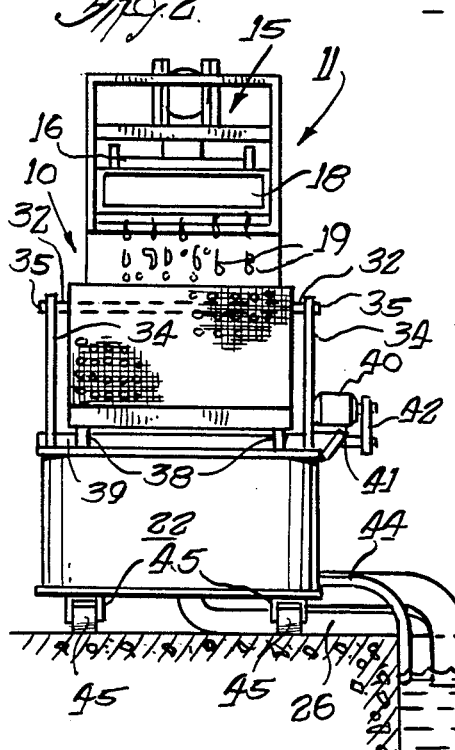
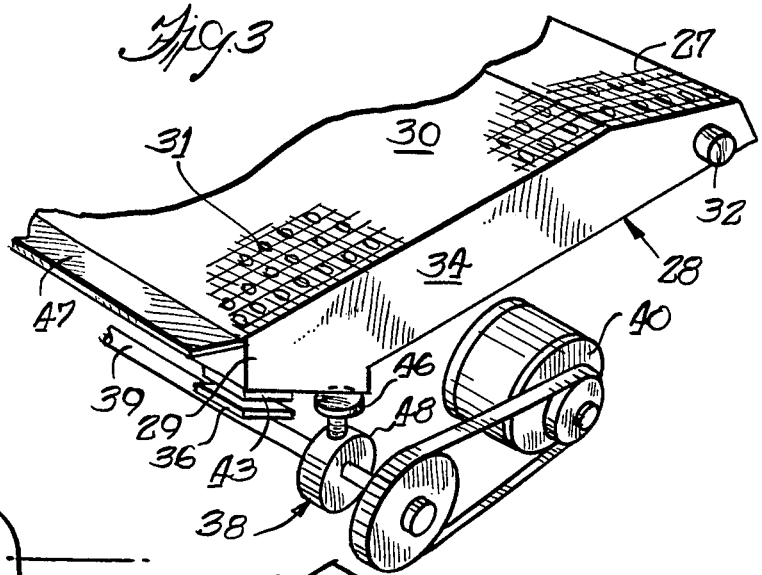
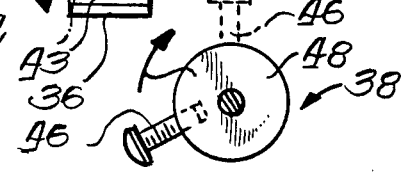

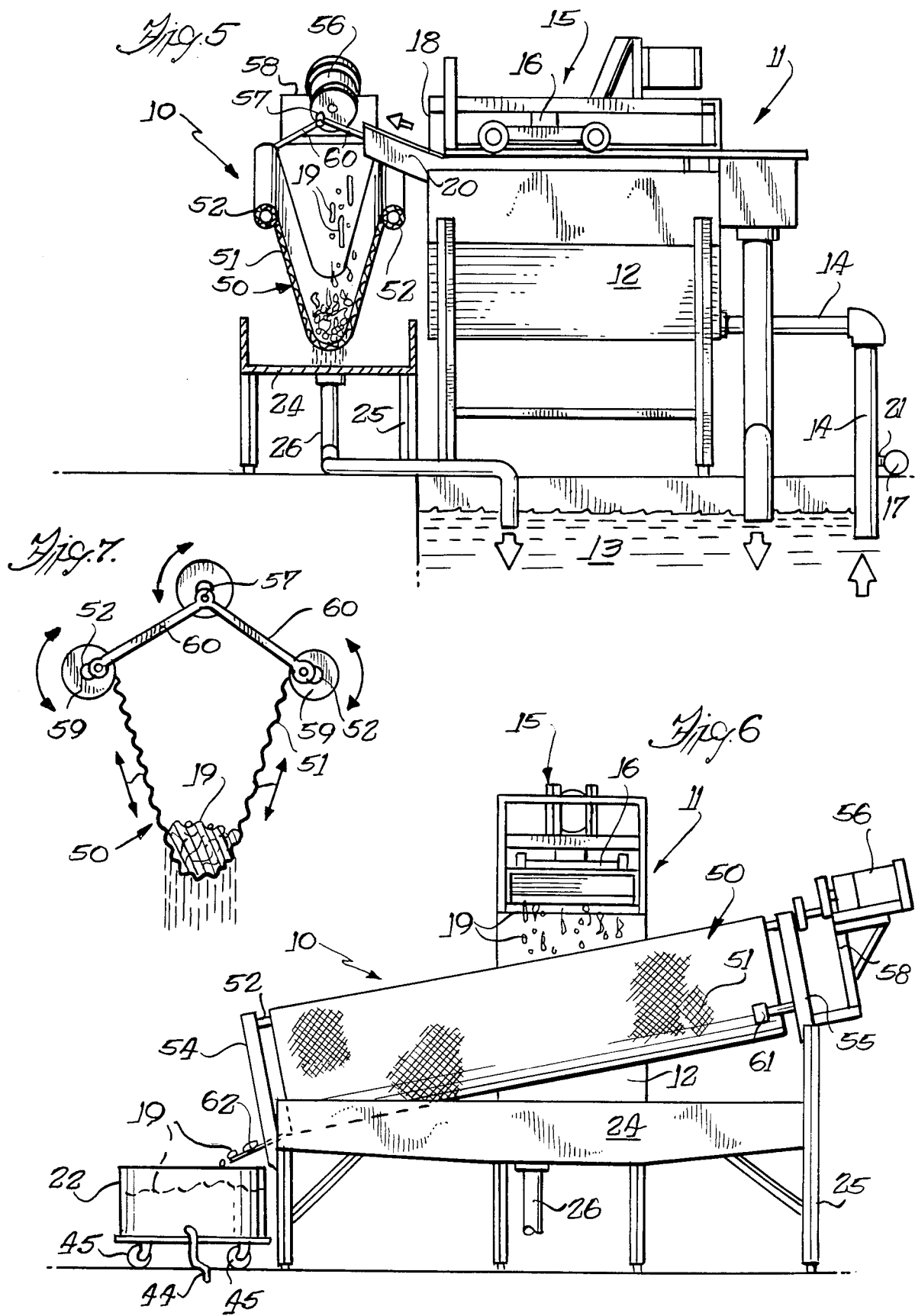

METHOD AND APPARATUS FOR HANDLING SLUDGE

The present invention relates to a method and apparatus for handling sludge precipitated during, e.g., water, sewage or air treatment processes and the like.

BACKGROUND OF THE INVENTION

In many industrial product treatment processes, safe disposal of byproducts of the processes is a significant problem. For example, in material finishing operations in which paint, enamel, lacquer, etc. are sprayed onto the product, the air ambient the products must be cleansed of the overspray before the air is exhausted into the surrounding atmosphere. The air may be cleansed of the overspray by means of water wash systems such as that shown in U.S. Pat. No. 4,484,513, having the same assignee as the present invention. The water-laden sludge formed of the overspray paint particles is initially separated from the water in the wash by means of skimming devices such as that shown in U.S. Pat. No. 4,432,870, also having the same assignee as the present application. This patent discloses the use of a separate tank to which sludge-laden water is conducted for removal of sludge and aeration of the water before the water is returned to the reservoir for recycling in the water wash or is otherwise disposed of. In the device of the patent, the sludge is urged to the surface of the tank through water circulation means, and is then skimmed off the surface of the water into a collection bin for recycling, disposal, etc.

In some instances rather than skimming the paint sludge from the water, the water and sludge are conveyed to a vacuum-type filter with the water and sludge being deposited on the top of a screen with a vacuum being applied under the screen to pull the water through the screen. The sludge is left on top of the screen. This system has a tendency to have the sludge clog the screens and is a high maintenance system. It will be appreciated that a very high volume of water to sludge is being conveyed to the screens and this water and the vacuum tend to cause the sludge to enter into and clog the screen holes. Another continuous process in which a high volume flow of water from the spray tank reservoir is used to convey the sludge particles is a centrifuge system in which the liquid and sludge particles are introduced into the top of the centerfuge and spun downwardly with the water being thrown off and with the sludge exiting through a bottom orifice. The sludge has a tendency to clog the centerfuge orifice and this also results in high maintenance problems. It will be appreciated that the sludge is a very cohesive and sticky material and may clog such orifices.

Batch type of processes have been employed to dewater sludge. For instance, sludge is shoveled from the bottom of a spray tank reservoir into drums which are transported into a filter press having press screens which squeeze the sludge. The screens must be cleaned very regularly or they become clogged.

There is a need for an improved method and apparatus for handling and dewatering sludge preferably on a continuous basis rather than a batch basis and, which can operate with reduced maintenance, as contrasted to the above-described systems. Preferably, such a system will remove sufficient water from the sludge that it may be classified as "dried sludge" rather than "liquid sludge." The changing of the sludge classification from "wet" to "dried" sludge greatly affects the methods by which it can safely be handled and stored. Specifically, a distinction is drawn between "dried" sludge and "liquid" sludge. Dried sludge is sludge that has been dewatered so that it can be transported and handled as a solid material, while liquid sludge is readily pumpable and must be transported by a closed vessel which will not allow any leakage or spillage. Dewatered sludge may be transported in open dump trucks. Further, neither containers holding free liquids nor noncontainerized liquid sludge may be placed in a landfill unless the landfill has an impermeable liner and leachate collection means. Consequently, greater safety and convenience can be obtained if the sludge is dewatered before disposal. Tests for classification of sludge are available from governmental agencies such as Environmental Protection Agencies.

Accordingly, it is a principal object of the present invention to provide an improved method and apparatus for dewatering sludge so that it can be safely and conveniently handled and stored.

It is another object to provide a method and apparatus which will dewater sludge sufficiently that it will be classified as dried sludge in an economic and convenient manner.

A still further object is to provide a method and apparatus that provides for the collection of both the solid sludge and liquid dewatered therefrom.

These objects and others will become apparent from the following description of the invention in which the water sludge suspension in the spray tank reservoir is conveyed to a skimming apparatus which separates the floating sludge from the water suspending the same. The reservoir water having been cleaned of the sludge is returned to the reservoir for reuse. The skimmed sludge is still too wet to be classified as "dried sludge" under most govermental standards so that it needs to be further dewatered before it can be classified as "dried sludge"; and to this end, the skimmed sludge is conveyed by conveying means to a sludge dewatering means which removes sufficient water from the skim sludge to have it classified as "dried sludge." The preferred dewatering means oscillates the sludge or produces a squeezing action on the sludge on a screen to exude the occluded water. The preferred screen is inclined and oscillated or vibrated to work the sludge downwardly while exuding water therefrom.

BRIEF DESCRIPTION OF THE DRAWINGS

FIG. 1 is a side elevation of an apparatus embodying the present invention in conjunction with a sludge skimming apparatus for initially separating sludge from the water;

FIG. 2 is an end elevation of the device of FIG. 1;

FIG. 3 is an enlarged perspective view of the inclined oscillating sieve means;

FIG. 4 is an enlarged fragmentary side elevation of the sieve oscillating means;

FIG. 5 is a side elevation of an alternate embodiment embodying the instant invention, once again in conjunction with a sludge skimming apparatus;

FIG. 6 is an end elevation of the device of FIG. 5; and

FIG. 7 is an enlarged cross-sectional view of the sieve oscillating means of the device of FIGS. 5 and 6.

DETAILED DESCRIPTION OF THE PREFERRED EMBODIMENTS

Referring to FIGS. 1-2 and 5-6, there is seen a sludge dewatering apparatus, generally indicated by 10, shown in conjunction with a sludge separation device 11, for initially removing supernatent sludge from the water that is used, e.g., in a water wash for entraining overspray particles in a spray booth. The sludge separation device 11 is preferably as described in U.S. Pat. No. 4,432,870, or in my copending application Ser. No. 688,571, filed Jan. 3, 1985, both having a common assignee and being herein incorporated by reference. The device 11 includes a separation tank 12 which receives a supply of liquid-sludge suspension from an adjacent holding tank or reservoir 13 of a spray booth, only, a booth wall 14 and the booth reservoir being illustrated herein. Herein, the water-sludge suspension is pumped through a conduit 14 having an outlet at the bottom of the separation tank 12. The reservoir 13 is associated with, e.g., a water wash for a spray booth (not shown) in which the airborne overspray particles in the booth are drawn into a water curtain which entrains the particles prior to flowing into the reservoir 13. Sludge and water from the reservoir 13 are pumped into the separation tank 12 and the sludge is circulated upwardly toward the surface of the water in the tank 12. An automatic skimming device 15, includes a motor-driven carriage 16 mounted for movement on top of the separation tank 12. A pusher plate 18 secured to the carriage 16 engages the supernatent sludge 19 and drives the sludge 19 up and off a ramp 20 and onto a dewatering apparatus, generally indicated by 10, from which it goes into a collection drum 22. Both the clarified water remaining in the separation tank 12 and the water occluded during the dewatering process are returned to the reservoir 13 where it is reused in the water wash or otherwise treated to facilitate its disposal. The paint sludge is comprised of the paint particles which have been agglomerated. The water in the reservoir is treated with agglomerating chemicals in a well-known manner to which cause the paint particles to stick together to form floating sludge pieces. These chemicals also assist in causing the density of the paint sludge to be less than that of the water so as to float on the water. The agglomeration results in a sticky or tacky sludge which adheres to surfaces and which tends to plug holes in screens. Further, the paint sludge is hydrophylic and has substantial quantities of water clinging thereto so that skimming from a body of liquid the sludge will be classified as a wet sludge. Thus, there is a very real problem of how to dewater the wet sticky paint sludge in an economical manner to provide dried paint sludge which can be disposed more simply and economically.

In accordance and with the present invention, a chemical such as, for example, a bentonite clay is injected into water in the reservoir to reduce very substantially the tackiness of sludge while not substantially destroying the agglomeration characteristics of the paint particles to adhere to one another. Also, in accordance with the preferred embodiment of the invention, the sludge is treated to change its hydrophylic character to a hydrophobic character to aid in a later dewatering of the wet skimmed sludge. This is achieved in this illustrated embodiment of the invention by injecting a polyelectrolyte material into the sludge bearing water by an injector 17 (FIG. 1) through a pipe 21 into the pipe 14 conveying the water from the reservoir 13 to the skimmer tank. Polyelectrolyte materials are well known and commercially available. The polyelectrolyte mixes gently because of the turbulence caused by the inlet pipe elbows and changes the state of the sludge from hydrophlic to hydrophobic so that the water tends to bead on the surface of the sludge and so that the water can be more readily separated mechanically from the solid paint particle agglomeration of the wet sludge.

In accordance with the invention, sludge dewatering means is provided to reduce the liquid content of the sludge prior to further handling, treatment or disposal of the sludge. The preferred dewatering means includes a sieve means which is disposed a predetermined distance below the edge of the ramp means 20 on the separation tank 12. Means are provided for causing the skimmed sludge to fall from the ramp 20 onto the sieve means, with the initial impact of the sludge falling onto the sieve causing the sludge to exude at least a portion of the water carried thereby and allowing it to pass through the sieve. Means is provided for vibrating or oscillating the sludge-supporting sieve so as to both cause further exudation of water from the sludge and to urge the sludge down the inclined surface of the sieve means toward a collection container 22. The amount of exudate is controlled by the angle of incline and length of the sieve means and by means for adjusting the frequency and amplitude of the oscillations of the sieve means, all of which combine to control the length of time that the sludge is on the sieve.

Turning to the embodiment of FIGS. 1-4, the sludge dewatering apparatus 10 includes an open-top drainage trough 24 supported on a stand 25 and having a return or drainage pipe 26 extending between a lower portion of the trough 24 and the reservoir 13. Sieve means 28 is supported over the trough 24 a predetermined distance below the edge of the ramp 20 on the separation tank 12. The distance between the edge of the ramp 20 and the upper portion of the sieve means 28 may be several feet or less. This distance ensures that, while a large portion of the water carried by the sludge 19 will be exuded upon impact with the sieve means 28, the fragile nature of the sludge 19 is not interfered with and the sludge remains intact. To provide an adequate landing area for the sludge 19, the upper area 27 of the sieve means 28 remains at a relatively small angle with respect to horizontal. As illustrated, the sieve means comprises an open box frame 29 carrying a perforated sheet 30 over its upper end. The perforated sheet 30 serves to support a screen 31 that is coextensive with the sheet 30. The screen support 30 and the screen 31 cooperate to permit water exuded from the sludge 19 to flow into the trough 24, while the maintaining the sludge on top of the sieve means 28. In practice, the screen support 30 is made of sheet metal having inch diameter perforations based at an interval of inches between centers, while the screen may be of nylon having a mesh size of To further exude water from the sludge 19 after it has fallen from the ramp 20 onto the sieve or screen means 28, means is provided for further manipulating or working the sludge. To this end, the screen means 28 is vibrated or abruptly oscillated. Accordingly, an axle 32 extends between the side members 34 of the box frame 29 and is received in conventional journal mountings 35 in the top of the sides of the trough 24. The screen means 28 extends downwardly at an incline from the journal supports 35 with its lower end resting on, but not attached to, support means such as that indicated at 36 in FIG. 3, so that this lower free end of the sieve means may move upwardly from its resting position.

To provide a density separation action between the polymeric sludge and the heavier density water, means are provided for repeatedly lifting the free end of the sieve means 28 and dropping it back onto the support means 36. The illustrated lifting and dropping means includes cam means 38 mounted on each end of an axle 39 journaled in the lower portion of the trough 24 so that the cam means 38 bear on each side member 34 of the screen frame 29. A variable speed motor 40 mounted on a stand 41 secured to the side of the trough 24 rotates the cam 38/axle 39 combination by means of a conventional belt-pulley arrangement 42. The lower end of the sieve 28 may include resilient shock absorbing pads 43 to prevent excessive wear on the sieve means 28. The action of the cam 38/axle 39 is best seen in FIG. 4. The cams 38 revolve to lift the sieve means 28 without shock, but to drop the sieve 28 rapidly back to its initial position. The intermittant slow rise of the sieve 28 and rapid fall with a sudden stop causes the heavier water to continue to fall relative to lighter polymeric paint sludge which is held against further dropping while the water continues to flow down through the sieve 28. The rising and falling action also changes the slope so that the sludge tends to slide down the screen to the lower end thereof.

Means is provided for varying the extent of vertical displacement of the sieve 28 comprising a threaded screw member 46 on each cam 38. The screw 46 may be moved into or out of the disk portion 48 of each cam 38 to effectively shorten or lengthen the throw of the cam 38. In practice, the throw of the cam 38 (and consequently, the distance the sieve means 28 will be dropped) varies between 0.0 inches and 0.50 inches.

Preferably, the lowest point of the screen means 28 has a reduced angle portion defined by a lip 47 to cause a backup or agglomeration of sludge 19 at the lower end of the screen. As more sludge 19 continuously arrives at the lip 47 of the screen, the sludge 19, now substantially dewatered is squeezed on the lip 47 by the in-coming sludge to the lip to aid in dewatering the sludge. Sludge will continue to be pushed across the lip 47 to fall from the lower portion of the sieve 28 into the collection drum 22. Any remaining water exuded from the sludge 19 by falling into the drum 22 may be drained off into, e.g., the reservoir 13 by means of a hose 44 at the bottom of the drum 22. After the last of the water is drained through the hose 44, the drum may be sealed and rolled away on casters 45.

The extent to which the sludge is dewatered is dependent upon the length of time the sludge remains on the screen while the sieve is oscillating. This, in turn, is dependent not only upon the magnitude and frequency of the oscillations, but also upon the length of the sieve and the angle of incline. It is contemplated that the sieve means 28 will be oscillated at a frequency of between 120 and 300 cycles per minute and that an angle of incline of between 25 and 35 degrees with a sieve length of between 2 feet and 0 inches and 3 feet and 0 inches will provide sufficient resident time for the sludge on the sieve to provide "dried" sludge for the purposes of sludge disposal.

Turning to FIGS. 5–7, an alternate embodiment of a sludge dewatering apparatus is seen. While the sludge is still dewatered by an oscillating or vibrating action of an inclined sieve or screen means, the mechanism by which the screen means works the sludge is altered. However, the elements common to both illustrated embodiments are identified by identical reference numerals. The screen means 50 includes a flexible oscillating inclined screen 51 disposed a predetermined distance below the ramp 20 and shown with its longitudinal axis transverse to the sludge separator 11 and disposed over the trough 24, which catches occluded water to return the same to the reservoir 13 through the return pipe 26. The screen 51, which is preferably made of nylon having a mesh size of approximately 200 microns, has a U- or a V-shaped cross-section, with its upper portions secured to elongated rods 52, which are mounted for synchronized rotation on supports 54, 55 at either end thereof. The sludge falls into lowest part of the V and squeezes together to exude water because of the individual sludge pieces squeezing together in the V of the screen 51.

One manner of oscillating the screen 51 is shown in FIG. 7 and includes a fluid motor cylinder 56 which is connected to a suitable fluid pressure source to reciprocate a rod 56a which has an end pinned to a block 57 secured to a roller chain 58 mounted to turn about sprockets 58a. The sprockets 58a are each secured to one of the rods 52 to which are secured the respective ends of the screen 51. As the rod 56a is reciprocated by the cylinder 56, the block 57 is driven rectilinearly back and forth toward the respective sprockets causing the respective rods attached thereto to wind and then unwind the ends of the screen attached thereto. Thus, the screen is oscillated back and forth.

As best seen in FIG. 6, a roller 61 is journaled on a shaft mounted on the support 55 to project into the shape of the flexible screen 51 during its oscillations. The synchronized oscillating motion creates a rolling action on the sludge and on the water clinging to the polymeric paint portion of the sludge causing the water to roll because of its heavier density than the polymeric solids relative to the solids and to drop therefrom. At the lower end of the screen 51 is an inclined lip 62 on which dewatered sludge 19 accumulates before dropping in the drum 22.

As with the first-described embodiment, the degree to which the sludge 19 is dewatered depends upon the magnitude and frequency of the oscillations (which may be controlled by the motor) and the length and angle of incline of the flexible screen. It is contemplated that for adequate sludge dewatering, the screen will wind and unwind about the rods 52 on the magnitude of to 4 inches at a frequency between 120 to 200 cycles per minute (i.e., one cycle constitutes one instance of the flexible screen 51 being wound about the elongated rods 52 and then unwound therefrom), while the longitudinal length of the screen is between 4 and 6 feet with the angle of incline of the screen being between 15 and 25 degrees.

For both illustrated embodiments, the general method of dewatering sludge is the same. Summarizing, the sludge, after being initially separated from the water, by a skimming apparatus is then conveyed to a dewatering means to remove sufficient water therefrom to classify the sludge as "dried" rather than "wet" sludge. The preferred step of dewatering includes vibrating, oscillating or otherwise working the sludge so as to additionally exude water. The exuded water drops through a screen to be returned to a reservoir or otherwise disposed of. The sludge travels across the screen and then drops into a container for storage, etc. Preferably, the sludge is changed from a generally hydrophilic state to a hydrophobic state by addition of a polyelectrolyte which polymerizes the paint particles. Also, it is preferred to add a chemical or material such as bentonite clay to the water to render the sludge less sticky or tacky to the screens used for dewatering the sludge.

Thus it can be seen that a sludge dewatering system has been provided that fully meets the objects set forth above. While the invention has been described in terms of certain preferred embodiments, there is no intent to limit the invention to the same. On the contrary, it is intended to cover all alternatives, modifications and equivalents within the scope of the appended claims.

What is claimed is:

1. An apparatus for separating and dewatering floating wet sticky, agglomerated paint sludge from a body of water and for dewatering the wet sludge to a dried sludge, said apparatus comprising means for providing a paint sludge sufficiently dry for enabling open transport and placement thereof in unlined landfills, including, a skimmer device having inlet means for connection to a reservoir to receive water bearing the sticky paint sludge and having a skimmer for skimming floating sticky paint sludge from the water and for discharging the skimmed sticky paint wet sludge,
   a porous conveyor means having a porous flexible screen receiving the wet paint sludge from said skimmer device and for conveying the wet sticky paint sludge,
   a supply roll of said porous flexible screen being wound in a roll and being unwound to provide a clean portion of screen to receive the wet sticky paint sludge,
   and means to impart a squeezing action on the wet sticky paint sludge to squeeze sufficient water therefrom to cause reclassification of the wet paint sludge to dry paint sludge.

2. An apparatus in accordance with claim 1 including means to rewind the porous flexible screen into a roll after the dewatering of the paint sludge.

3. A method of separating sticky tacky paint sludge floating in a body of water and dewatering the wet paint sludge to reclassify the wet paint sludge as dried sludge, said method comprising the steps of:
   providing paint sludge sufficiently dry for enabling open transport transport and placement thereof in unlined landfills, by
   skimming floating wet paint sludge from a body of water in a skimmer device,
   discharging the skimmed wet paint sludge onto a fresh porous screen conveyor belt,
   unwinding a roll of porous screen conveyor belt from a supply roll and moving the unwound screen to receive the discharging skimmed wet paint sludge,
   and squeezing the wet paint sludge while on the porous screen to squeeze water from the wet paint sludge to cause reclassification of the wet paint sludge from a wet sludge to a dry sludge.

4. The method of claim 3 including the step of:
   rewinding the flexible porous screen into a roll after the dewatering of the paint sludge.

* * * * *